US012589768B2

(12) United States Patent
Sugiarto et al.

(10) Patent No.: US 12,589,768 B2
(45) Date of Patent: Mar. 31, 2026

(54) PATH DETERMINATION FOR AUTONOMOUS VEHICLE PARKING

(71) Applicant: Aptiv Technologies AG, Schaffhausen (CH)

(72) Inventors: Tanto Sugiarto, West Lafayette, IN (US); Mateusz Orlowski, Cracow (PL); Wojciech Turlej, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 85 days.

(21) Appl. No.: 18/590,375

(22) Filed: Feb. 28, 2024

(65) Prior Publication Data

US 2025/0269873 A1     Aug. 28, 2025

(51) Int. Cl.
    *B60W 60/00*        (2020.01)
    *B60T 7/12*         (2006.01)
                       (Continued)

(52) U.S. Cl.
    CPC ...........  *B60W 60/0011* (2020.02); *B60T 7/12*
        (2013.01); *B60W 10/04* (2013.01); ***B60W
                                    10/18*** (2013.01);
                       (Continued)

(58) Field of Classification Search
    CPC .. B60W 60/0011; B60W 10/04; B60W 10/18;
                            B60W 10/20; B60W 30/06;
                       (Continued)

(56) References Cited

U.S. PATENT DOCUMENTS 9,587,951 B1 *   3/2017   Hamida .................. G01S 19/50
9,969,386 B1 *   5/2018   Wang ................... B62D 15/027
                       (Continued)

FOREIGN PATENT DOCUMENTS

EP              3568334 B1     11/2019
WO       WO-2021035759 A1 *   3/2021   ............. G01C 21/34
WO       WO 2023/199610 A1 *  10/2023   ............... B62D 1/02

OTHER PUBLICATIONS

Extended European Search Report for EP24172960.7 dated Sep. 26, 2024, 11 pages.
Dubins Path, Wikipedia, Mar. 4, 2024, https://en.wikipedia.org/wiki/Dubins_path.

*Primary Examiner* — Redhwan K Mawari
(74) *Attorney, Agent, or Firm* — Miller Johnson

(57)          ABSTRACT

A method of determining a movement path for a vehicle includes determining a set of adjacent nodes with respect to a current node. The method includes determining, via a neural network, a subsequent path node and determining whether a path based on the subsequent path node connects a source to a goal node. The method includes, in response to a determination that the path based on the subsequent path node does not connect the source node to the goal node, determining an alternative subsequent path node, and determining, via the neural network, a second path based on the alternative subsequent path node. The method includes, in response to a determination that the path based on the subsequent path node connects the source to the goal node, selecting the path based on the subsequent path node as the movement path, and executing a set of actions associated with the movement path.

24 Claims, 7 Drawing Sheets

(51) Int. Cl.

| | |
|---|---|
| *B60W 10/04* | (2006.01) |
| *B60W 10/18* | (2012.01) |
| *B60W 10/20* | (2006.01) |
| *B60W 30/06* | (2006.01) |
| *B60W 50/14* | (2020.01) |
| *B62D 15/02* | (2006.01) |
| *G05D 1/228* | (2024.01) |
| *G06Q 10/047* | (2023.01) |

(52) U.S. Cl.
CPC ............ *B60W 10/20* (2013.01); *B60W 30/06* (2013.01); *B60W 50/14* (2013.01); *B62D 15/028* (2013.01); *B62D 15/0285* (2013.01); *G05D 1/228* (2024.01); *G06Q 10/047* (2013.01); *B60T 2201/10* (2013.01); *B60W 2050/146* (2013.01)

(58) Field of Classification Search
CPC ... B60W 50/14; B60W 2050/146; B60T 7/12; B60T 2201/10; B62D 15/028; B62D 15/0285; G05D 1/228; G06Q 10/047
See application file for complete search history.

(56) References Cited

U.S. PATENT DOCUMENTS

| | | | | |
|---|---|---|---|---|
| 10,078,790 | B2 * | 9/2018 | Wang | G06F 18/2431 |
| 10,286,904 | B2 * | 5/2019 | Yaldo | G08G 1/143 |
| 10,831,205 | B2 * | 11/2020 | Sumioka | B60W 30/09 |
| 10,896,611 | B1 * | 1/2021 | Ledet | G08G 1/012 |
| 11,168,993 | B1 * | 11/2021 | Tsoupko-Sitnikov | G01C 21/3407 |
| 11,227,495 | B1 * | 1/2022 | Ledet | H04W 4/027 |
| 11,292,454 | B2 * | 4/2022 | Moshchuk | B60L 53/12 |
| 11,335,189 | B2 * | 5/2022 | Lewis | G06N 20/00 |
| 11,335,191 | B2 * | 5/2022 | Lewis | G08G 1/0129 |
| 2018/0105166 | A1 * | 4/2018 | Sharma | B62D 15/0285 |
| 2018/0148051 | A1 * | 5/2018 | Lujan | B60W 30/18154 |
| 2019/0163186 | A1 * | 5/2019 | Yoon | B62D 1/00 |
| 2019/0338494 | A1 * | 11/2019 | Moriki | E02F 9/2029 |
| 2020/0406888 | A1 * | 12/2020 | Hamai | B60W 10/20 |
| 2021/0300336 | A1 * | 9/2021 | Hara | G06V 20/58 |
| 2021/0316721 | A1 * | 10/2021 | Lim | B62D 15/0265 |
| 2022/0073101 | A1 * | 3/2022 | Wang | B62D 15/0285 |
| 2025/0208620 | A1 * | 6/2025 | Bagschik | G06N 3/08 |

* cited by examiner

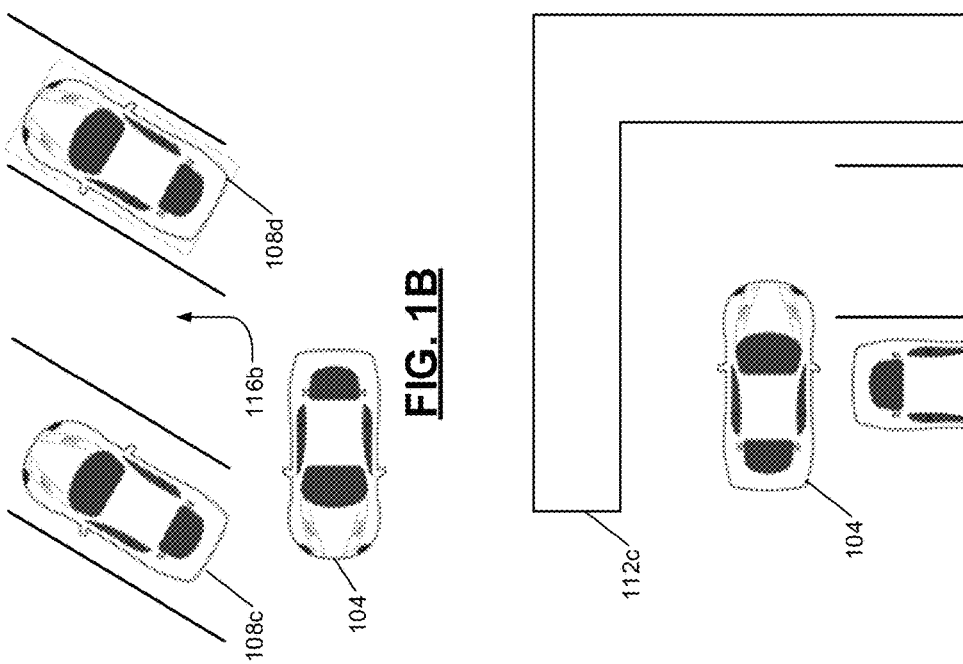
FIG. 1B
FIG. 1D
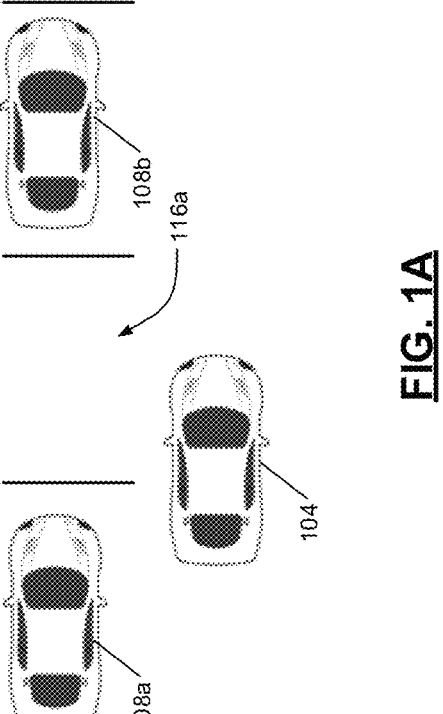
FIG. 1A
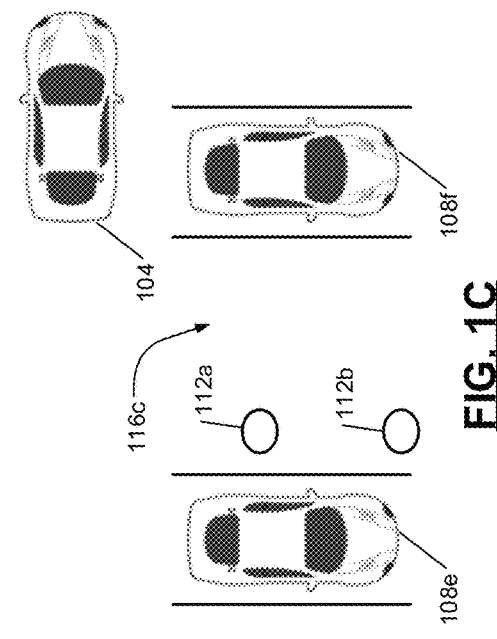
FIG. 1C

PATH DETERMINATION FOR AUTONOMOUS VEHICLE PARKING

FIELD

The present disclosure relates to autonomous vehicle control and, in particular, to determining a vehicle path for assisted and/or autonomous vehicle parking.

BACKGROUND

Modern vehicles often integrate software-driven platforms with advanced sensing and control to provide some degree of assistance to the driver. One example of driver assistance is assisted or even autonomous parking. The vehicle system gathers data from various onboard sensors regarding the surroundings of the vehicle. The obtained data is then analyzed to identify possible parking spaces and an optimal vehicle path into the identified parking space.

Identifying the optimal vehicle path requires complex computation involving the position of the vehicle and any nearby obstacles. Dynamic programming (DP) can be applied to exhaustively search the area and determine a path into a parking spot. The path found from DP should avoid collisions with other parked cars and be kinematically feasible for the vehicle (for example, most traditional vehicles can only move forward or backward based on the steering angle of the front wheels with a maximum steering angle of +/−30 degrees). The Dijkstra algorithm is one of the DP implementations commonly used in real-world applications. The Dijkstra algorithm determines a value that represents the travel distance between a set of nodes, which can be used to determine an optimal path between two points. However, as the number of nodes increases, the computational time increases exponentially. The computational time required for pathfinding can be reduced by using a heuristic cost function such as A*, Hybrid A*, D*, and/or D* Lite. These heuristic cost functions assign costs to nodes; the costs are used to prioritize which nodes should be searched first to determine an optimal path.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of determining a movement path for a vehicle from a source node to a goal node includes determining a set of adjacent nodes. The source node corresponds to a current position and a current orientation of the vehicle and the goal node is defined with respect to the source node. Each node of the set of adjacent nodes represents movement of the vehicle with respect to a current node. The method includes determining a set of costs associated with the set of adjacent nodes. The method includes determining a subsequent path node based on a current node by determining, via a neural network, a predicted node based on the current node. The predicted node represents movement of the vehicle with respect to the current node. The method includes determining, via the neural network, a first set of path nodes based on the subsequent path node. The method includes determining whether a path defined by the first set of path nodes connects the source node to the goal node. The method includes, in response to a determination that the path defined by the first set of path nodes does not connect the source node to the goal node, determining an alternative subsequent path node based on a lowest cost node of the set of adjacent nodes, and determining, via the neural network, a second set of path nodes based on the alternative subsequent path node. The method includes, in response to a determination that the path defined by the first set of path nodes connects the source node to the goal node, selecting the first set of path nodes as the movement path, and executing a set of actions associated with the movement path.

In other features, the set of actions includes autonomously moving the vehicle along the movement path. In other features, the set of actions includes automatically controlling steering of the vehicle along the movement path. In other features, the set of actions includes automatically controlling steering, acceleration, and braking of the vehicle along the movement path. In other features, the set of actions includes displaying prompts to a driver for moving the vehicle along the movement path. In other features, the goal node corresponds to a vehicle parking position. In other features, the method includes receiving location and orientation information for the goal node from a parking spot selection module.

In other features, the method includes, in response to a determination that the path defined by the second set of path nodes connects the source node to the goal node selecting the second set of path nodes as the movement path, and executing a second set of actions associated with the movement path. In other features, the neural network is generated via a machine learning model trained by reinforcement learning via repeated simulations of vehicle movement in varied environments.

In other features, a respective cost of the set of costs is associated with a respective node. The respective cost of the respective node is based on a quantity of movement direction changes associated with the respective node, a quantity of movement direction changes associated with a path formed from the source node to the respective node, a path length associated with the path formed from the source node to the respective node, a magnitude of a steering angle associated with the respective node, a magnitude of change in a steering angle from a previous node to the steering angle associated with the respective node, and/or whether the respective node was recommended by the neural network.

In other features, the path length is measured in terms of at least one of a number of nodes and/or a total movement distance. In other features, a respective node of the set of adjacent nodes is associated with a set of coordinates including an x-coordinate corresponding to a possible vehicle location, a y-coordinate corresponding to the possible vehicle location, and an angle corresponding to a possible vehicle orientation at the possible vehicle location.

In other features, the respective node of the set of adjacent nodes is associated with a first cost based on the possible vehicle location, a first movement distance, a first movement direction, and a first steering angle required to reach the possible vehicle location from the current node.

In other features, the method includes determining, based on a cost associated with the current node, whether the respective node of the set of adjacent nodes is associated with a cost above a cost threshold. In other features, the method includes in response to the determination that the respective node is associated with a cost above the cost threshold, excluding the respective node from the set of adjacent nodes. In other features, the method includes receiving, from an obstacle detection module, data corresponding to a set of obstacles.

A system of determining a movement path for a vehicle from a source node to a goal node includes memory hardware and processor hardware communicatively coupled to the memory hardware. The source node corresponds to a current position and a current orientation of the vehicle and the goal node is defined with respect to the source node. The processor hardware is configured to determine a set of adjacent nodes. Each node of the set of adjacent nodes represents movement of the vehicle with respect to a current node. The processor is configured to determine a set of costs associated with the set of adjacent nodes. The processor is configured to determine a subsequent path node based on a current node by determining, via a neural network, a predicted node based on the current node and selecting the predicted node as the subsequent path node. The predicted node represents movement of the vehicle with respect to the current node. The process is configured to determine, via the neural network, a first set of path nodes based on the subsequent path node. The processor is configured to determine whether a path defined by the first set of path nodes connects the source node to the goal node. The processor is configured to, in response to a determination that the path defined by the first set of path nodes does not connect the source node to the goal node, determine an alternative subsequent path node based on a lowest cost node of the set of adjacent nodes, and determine, via the neural network, a second set of path nodes based on the alternative subsequent path node. The process is configured to, in response to a determination that the path defined by the first set of path nodes connects the source node to the goal node, select the first set of path nodes as the movement path, and execute a set of actions associated with the movement path.

In other features, the processor hardware is configured to, in response to a determination that the path defined by the second set of path nodes connects the source node to the goal node select the second set of path nodes as the movement path, and execute a second set of actions associated with the movement path.

In other features, a respective cost of the set of costs is associated with a respective node. In other features, the respective cost of the respective node is based on a quantity of movement direction changes associated with the respective node. In other features, the respective cost of the respective node is based on a quantity of movement direction changes associated with a path formed from the source node to the respective node. In other features, the respective cost of the respective node is based on a path length associated with the path formed from the source node to the respective node. In other features, the respective cost of the respective node is based on a magnitude of a steering angle associated with the respective node. In other features, the respective cost of the respective node is based on a magnitude of change in a steering angle from a previous node to the steering angle associated with the respective node. In other features, the respective cost of the respective node is based on whether the respective node was recommended by the neural network. In other features, the path length is measured in terms of at least one of a number of nodes, and a total movement distance.

In other features, a respective node of the set of adjacent nodes is associated with a set of coordinates including an x-coordinate corresponding to a possible vehicle location, a y-coordinate corresponding to the possible vehicle location, and an angle corresponding to a possible vehicle orientation at the possible vehicle location.

In other features, the respective node of the set of adjacent nodes is associated with a first cost based on the possible vehicle location, a first movement distance, a first movement direction, and a first steering angle required to reach the possible vehicle location from the current node. In other features, the processor hardware is configured to determine, based on a cost associated with the current node, whether the respective node of the set of adjacent nodes is associated with a cost above a cost threshold. In other features, the processor hardware is configured to, in response to the determination that the respective node is associated with a cost above the cost threshold, exclude the respective node from the set of adjacent nodes.

BRIEF DESCRIPTION OF THE DRAWINGS

The present disclosure will become more fully understood from the detailed description and the accompanying drawings.

FIGS. 1A-1D are examples of vehicle parking environments and positions.

DETAILED DESCRIPTION

Introduction

Figure 2:
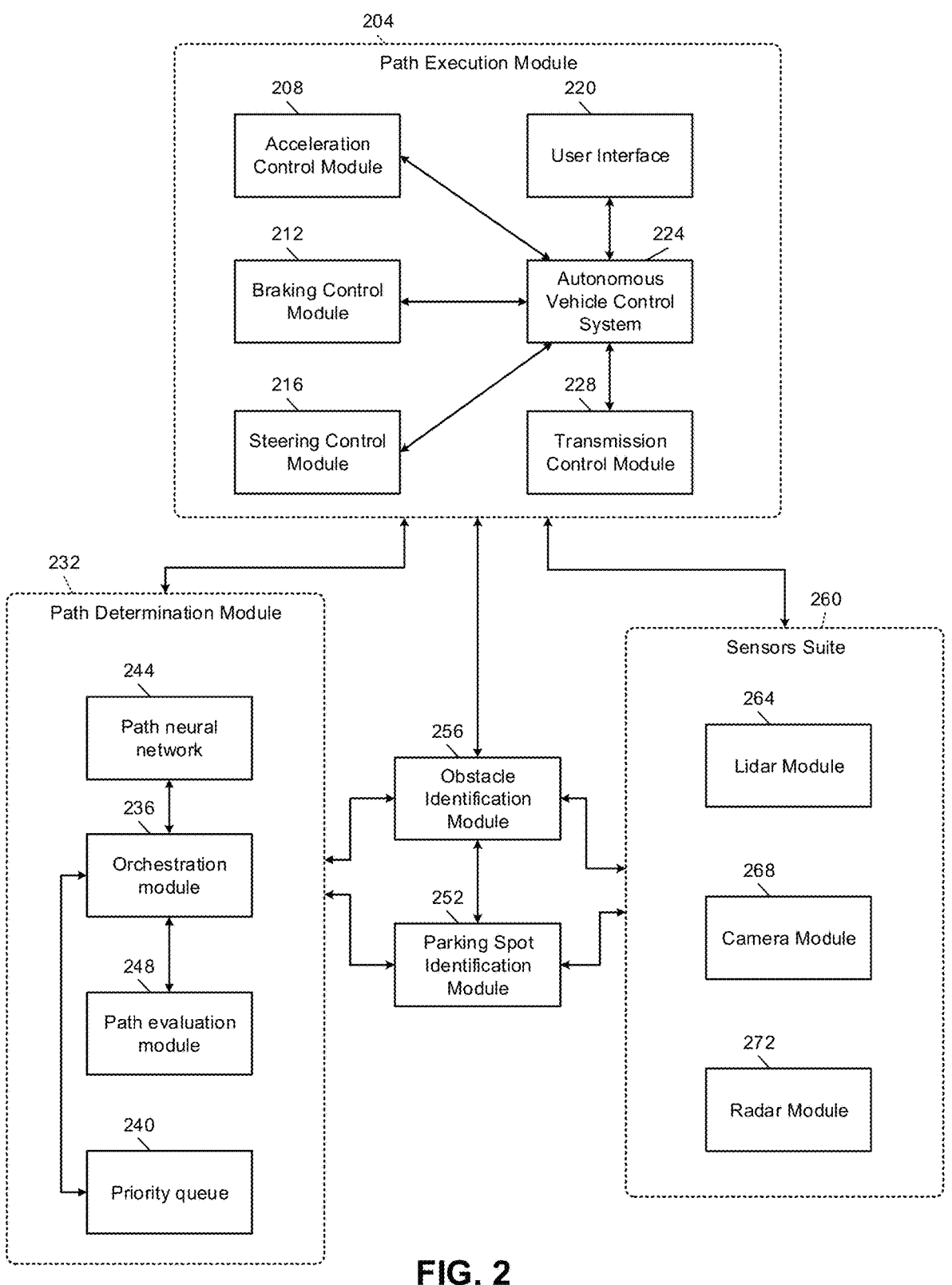
FIG. 2 is a block diagram of an example system for determining a movement path for a parking vehicle.

The present disclosure proposes using a neural network to lower the computational time required to determine an optimal movement path for a vehicle. In some implementations, the neural network is generated by a machine learning model trained via reinforcement learning. In particular, the neural network is trained to identify a path from a source vehicle position to a goal parking position. Path-finding algorithms identify and analyze nodes (locations and/or vehicle actions that form the path from a current position to a goal position). The proposed method enables shorter computation times in complex parking scenarios by reducing the number of nodes that must be analyzed to find the path from the source position to the goal parking position. In some implementations, the vehicle's current position, a goal position, and/or obstacle information is inputted into the neural network to determine a predicted movement segment to reach the next node. For example, based on a specified parking scenario, the neural network output may specify a forward movement of the vehicle by one meter with a five degree steering angle.

The node that is currently being considered (i.e., whether the node should be added to the potential vehicle movement path) by the search algorithm is called the "current node." The current node is connected to the source node (the vehicle's current location) via a path of previous nodes. The algorithm analyzes adjacent nodes of the current node, analyzing potential costs associated with each node (i.e., the costs of traveling to the node, such as distance, amount of turning required, or the number of times the vehicle must change between reverse and forward movement). The other adjacent nodes are stored in case the neural network recommendation does not result in the correct movement path. In some implementations, the adjacent nodes are sorted by cost in a priority queue. The node recommended by the neural network is assigned the lowest cost of the available nodes, ensuring that the neural network recommendation is prioritized by the pathfinding algorithm.

This process is repeated iteratively, and the neural network's output becomes the new "current node" and is used as input to predict the next step in the path. This process repeats until a path from the vehicle to the parking position is found or until the path fails (for example, if the path would result in a collision with an obstacle such as a wall or another parked vehicle). If a path fails, the algorithm returns to the most recent previous node, assigning it as the current node, and investigates the next lowest cost node adjacent to the current node (ignoring previously investigated nodes such as the node recommended by the neural network). The lowest cost node is used as input to the neural network and the process repeats.

Parking Scenarios

The proposed method simplifies pathfinding computation in many different parking scenarios, such as those depicted in FIGS. 1A-1D. In FIG. 1A, vehicle 104 (referred to as ego vehicle 104—the vehicle that contains sensors for perceiving the environment around the vehicle) can park in parking spot 116a, which is between parallel parked vehicle 108a and vehicle 108b, if a movement path can be determined from a current position of ego vehicle 104 to parking spot 116a. In FIG. 1B, ego vehicle 104 can park diagonally in parking spot 116b between vehicle 108c and vehicle 108d. In FIG. 1C, ego vehicle 104 can park in parking spot 116c between vehicle 108e and vehicle 108f. Parking spot 116c also contains obstacle 112a and obstacle 112b (for example—concrete pillars). FIG. 1D depicts a complex parking scenario: parking spot 116d is between parked vehicle 108g and obstacle 112c, which inhibits ego vehicle 104 movement while parking.

Determining a Movement Path

A vehicle equipped with autonomous functionality can assist drivers by determining how the vehicle should move to successfully park. In some implementations, vehicle, position, obstacle data and/or parking position are received and used as inputs to determine a movement path. Parking position may include a location as well as an orientation. In some situations, the parking position may include a location and two possible orientations separated by 180° (when direction of the parked vehicle is not important).

In some implementations, a movement path from a vehicle position to an identified parking spot can be determined via computationally light algorithms, such as Reeds Shepp. However, Reeds Shepp cannot account for obstacles, and therefore is not always applicable. In complex parking scenarios (or if the Reeds Shepp path is not obstacle free), more robust pathfinding algorithms are required. In some implementations, an A* pathfinding algorithm is used. A* algorithms (also known as a heuristic algorithm) assign costs to each step in the path (or node). By prioritizing the least expensive paths, the path from one point to another can be found more quickly than in a traditional brute force algorithm such as Dijkstra. In some implementations, inexpensive algorithms such as Reeds Shepp are used iteratively at each node before continuing analysis with heuristic or brute force algorithms.

In some implementations, each path node is associated with an action (i.e., a movement segment) and the cost of the action. Costs can be based on the distance of the movement step, the total distance of the path (i.e., of the current step and all previous steps leading to that point), the magnitude of the steering angle (for example, in some implementations, more extreme steering angles have a higher cost), the change in a proposed steering angle from a previous angle (for example, a change from −10 degrees to 20 degrees has a higher cost than a change from 10 to 20 degrees), and/or a quantity of movement direction changes (i.e., how many times the vehicle has shifted between forward and reverse movement along the potential path).

In order to determine the path, the algorithm investigates nodes adjacent to the current node. The algorithm determines the costs of each potential node, and selects the cheapest of the nodes for investigation. The other adjacent nodes and their costs are saved in a priority queue (with the least costly node saved on top) and the selected node becomes the new current node and the process repeats. If a path node results in a failure (such as a collision or termination in a location that is not the goal), the algorithm returns to the immediately previous node and selects the second least expensive path node (the least expensive having already been searched) for investigation.

To reduce computation time, a neural network is integrated into the pathfinding algorithm. The neural network receives the goal vehicle position (e.g., location and orientation), obstacle data, and a current location as input (i.e., the current node, such as the vehicle starting position) and outputs a recommended path segment (for example, move 1 meter forward at a 3 degree steering angle). In some implementations, obstacles are defined as convex polygons. The recommended path segment from the neural network is assigned the lowest cost of the adjacent nodes so that it is prioritized for investigation. If a recommended path results in path failure, the algorithm returns to the immediately previous node, and the second least expensive node is selected for investigation and assigned to the current node. As described above, the adjacent nodes are investigated via Reeds Shepp and if an obstacle-free path is not found, the current node is used as input to the neural network and analyzed via the heuristic algorithm.

In some implementations, the output of the neural network is a one meter path segment in a particular direction (i.e., at a particular steering angle) that corresponds to a particular node. In some implementations, nodes correspond to a location. In some implementations, each node is associated with multiple actions and each action is associated with a cost. In some implementations, each available action is investigated when a node is investigated. In some implementations, only actions below a cost threshold are investigated. For example, a path node corresponding to movement at the maximum steering angle is not investigated. In some implementations, a node is associated with an x-coordinate, a y-coordinate, and an angle (i.e., the car's orientation).

Using a neural network to recommend a path (e.g., a set of nodes) to investigate can reduce computation time substantially as the neural network is not exhausting all path possibilities as a traditional pathfinding algorithm would. In some implementations, the neural network is generated via a machine learning data model trained via reinforcement learning.

Once a path as been found that connects the current vehicle location to the goal parking position, the path is executed. In some implementations, the path is executed fully autonomously without the need for driver input. In some implementations, the path is executed partially autonomously, with limited user input. For example, a driver confirms execution of the path and/or makes gear changes via the vehicle transmission. In some implementations, the path is fully executed by the driver. When the path is executed with driver assistance, visual prompts or directions are displayed to assist the driver aligning with the movement path.

Block Diagram

FIG. 2 is a block diagram of an example system used to generate a vehicle movement path from a current vehicle position to a goal parking position. Sensor suite 260 includes one or more sensors such as lidar module 264, camera module 268, and/or radar module 272. In some implementations, sensor suite 260 includes multiple instances of lidar module 264, camera module 268, and/or radar module 272. In some implementations, sensor suite 260 includes one or more additional sensors used in autonomous vehicle implementations. Sensors of sensor suite 260 are mounted to ego vehicle 104 in one or more locations and detect the area surrounding ego vehicle 104 (such as other vehicles, lane lines, pedestrians, and/or traffic control devices etc.) Parking spot identification module 252 uses data received from sensor suite 260 to determine an optimal parking position (location and vehicle orientation). Obstacle identification module 256 uses data received from sensor suite 260 to identify obstacles surrounding ego vehicle 104 and/or obstacles that may bound or limit movement from the current position of ego vehicle 104 to a goal parking position. In some implementations, parking spot identification module 252 receives data from obstacle identification module 256 to determine the optimal parking position. In some implementations, obstacle identification module 256 is a sub-module within path determination module 232.

Path determination module 232 uses data received from parking spot identification module 252 and obstacle identification module 256 to determine the movement path from the current position of ego vehicle 104 to a goal parking position. In some implementations, orchestration module 236 manages communications between components of path determination module 232, path execution module 204, obstacle identification module 256, and/or parking spot identification module 252. In some implementations, priority queue 240 is used to store nodes and their associated costs while determining a path from the vehicle location to the goal parking position. In some implementations, orchestration module 236 manages adding and removing nodes from priority queue 240. In some implementations, a movement vehicle path can be found with a computationally light algorithm via path evaluation module 248 without using neural network 244.

In some implementations, multiple algorithms are used at various stages of pathfinding. In some implementations, path determination module 232 may use several algorithms iteratively at various nodes (e.g., determining whether a path exists with a first algorithm before investigating with a second algorithm). For example, in some implementations, path evaluation module 248 determines a path first via Reeds Shepp at each node before determining a next node via neural network 244 and/or pathfinding algorithms. In some implementations, path evaluation module 248 includes various pathfinding algorithms such as Reeds Shepp, Dijkstra, A*, Hybrid A*, D*, and/or D* Lite. In some implementations, path evaluation module 248 uses other pathfinding algorithms. In some implementations, path evaluation module 248 is unable to find a movement path in the allotted time without neural network 244.

Path determination module 232 communicates the determined path to path execution module 204. In some implementations, path execution module 204 is fully autonomous and vehicle movement is controlled via autonomous vehicle control system 224—which in turn controls acceleration control 208, braking control 212, steering control 216, and transmission control module 228. In some implementations, path execution module 204 uses data from sensor suite 260 to execute the determined vehicle path. In some implementations, path execution module communicates with sensor suite 260 to check for collisions periodically (e.g., every 1, 3, 5, 10, or 20 seconds) while the movement path is executed. In some implementations, path execution module 204 is partially autonomous. For example, autonomous vehicle control system 224 controls acceleration, braking, and steering, but requires manual user interaction to change vehicle direction (i.e., change gears from drive to reverse and vice versa) and/or to place the vehicle in park.

In some implementations, path execution is not autonomous and requires full user execution of the determined movement path. In some implementations, path execution steps (for example, an instruction to reverse for 2 meters with at a 7 degree angle) are displayed via user interface 220. In some implementations, an outline of the determined path overlaid on the physical surrounds of ego vehicle 104 is displayed via user interface 220. In some implementations, a projected path of the vehicle is displayed with the determined path via user interface 220, enabling a driver of ego vehicle 104 to adjust steering until the projected vehicle path aligns with the determined path. In some implementations, user interface 220 outputs non-visual user feedback such as auditory commands, auditory signals, and/or haptic feedback to assist a driver in aligning the vehicle with the determined movement path, indicate to the driver that input is required, and/or indicate that the vehicle is autonomously executing a maneuver.

Flowchart

Figure 3A:
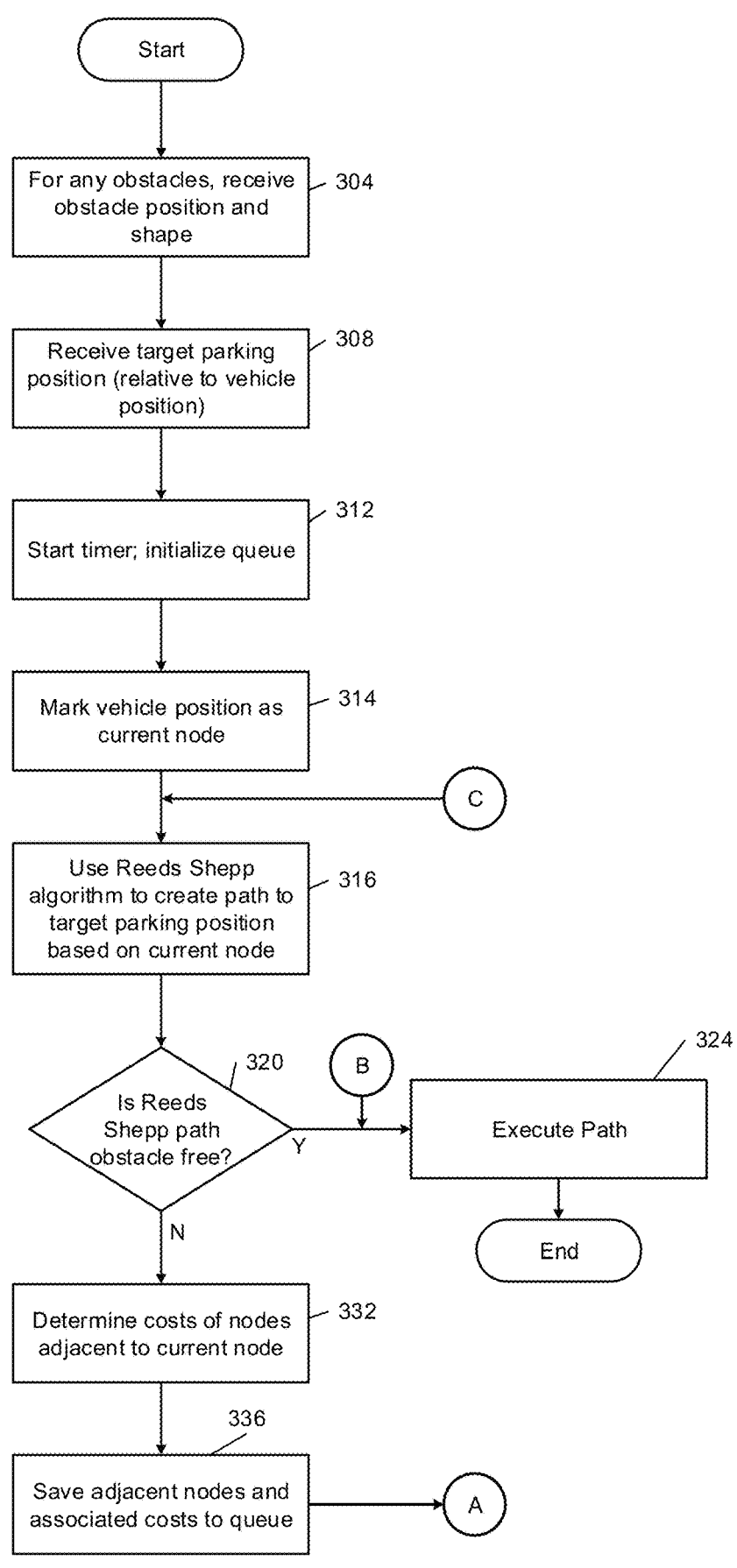
FIGS. 3A-3B are a flowchart for an example method for determining a movement path for a parking vehicle.
Figure 3B:
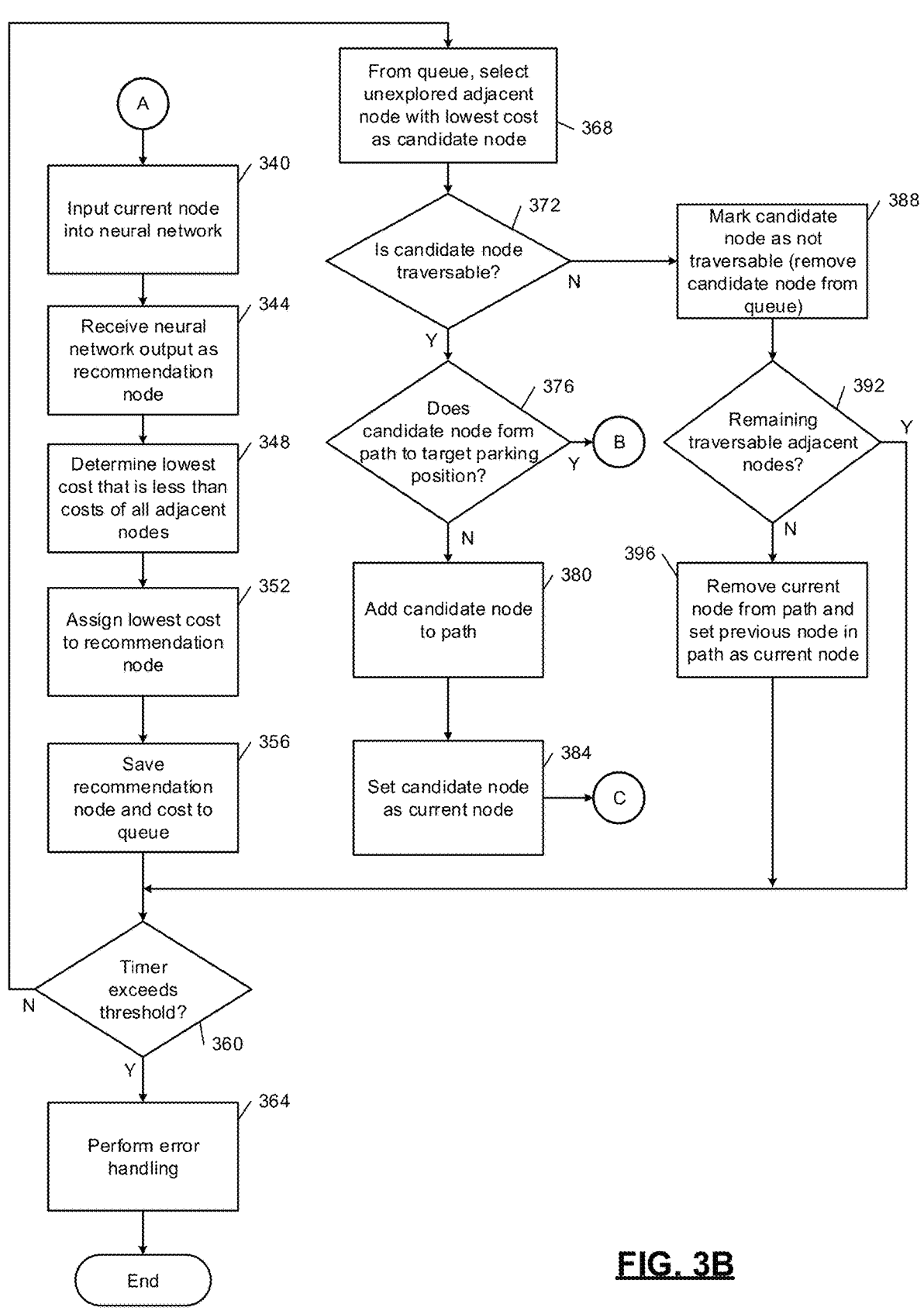

FIGS. 3A-3B are a flowchart for an example method of determining a movement path for a parking vehicle. The method begins at 304 and control receives obstacle data (e.g., from obstacle identification module 256 such as obstacle locations, size, and/or shape). At 308, control receives a target parking position (e.g., a target location and/or target orientation relative to the vehicle's current position). At 312, control starts a timer and initializes a storage queue for possible path nodes. At 314, control assigns the vehicle's current position as the current node. At 316, control determines a path from the current node to the target parking position using the Reeds Shepp (RS) algorithm. At 320, control determines if the RS path is obstacle free. If the RS path is obstacle free, control transfers to 324. At 324, control executes the path (either autonomously or with driver input) and control ends. If the RS path is not obstacle free, control transfers to 332.

Next, at 332, control determines the costs of nodes adjacent to the current node and continues to 336. At 336, control saves the adjacent nodes and the associated costs to the queue, and control continues to 340. At 340, control uses the current node as input into a neural network. At 344, control receives the neural network recommendation (i.e., which adjacent node is recommended by the neural network). At 348, control determines the lowest cost that is lower than all adjacent node costs. At 352, control assigns the recommended node the lowest cost, ensuring it will be prioritized. At 356, control saves the recommendation node and associated cost to the queue. In some implementations, the adjacent nodes and costs are not saved in the priority queue until the neural network recommendation is determined.

At 360, control determines if the timer has exceeded a threshold. If true, control transfers to 364 and performs error handling (such as displaying prompt to the driver that a path was not found and/or a prompt to the driver to continue driving) and control ends. If false (i.e., the timer has not exceeded the threshold), control transfers to 368. In some implementations, the method does not include a timer, and control skips starting a timer at 312 and continues directly to 368 without determining if the timer has exceeded a threshold at 360.

At 368, control selects the top node from the queue (i.e., the adjacent node with the lowest costs that is unexplored) as the candidate node. At 372, control determines if the node is traversable (i.e., does not lead to collision and/or have no other adjacent nodes). If the candidate node is traversable, control transfers to 376. If the candidate node is not traversable, control transfers to 388. At 376, control determines if the candidate node forms a path from the vehicle's current position to the target parking position. If yes, control transfers to 324. If no, control transfers to 380. At 380, control adds the candidate node to the path. At 384, control sets the candidate node as the current node and returns to 316.

At 388, control marks the candidate node as not traversable (i.e., removes the candidate node from the queue) and continues to 392. At 392, control determines if the current node has remaining traversable adjacent nodes. If yes, control transfers to 360. If no, control transfers to 396. At 396, control removes the current node from the path and sets the previous node (i.e., the node that led to the current node) as the current node, and returns to 360.

Machine Learning

Machine learning models require training such as supervised learning, semi-supervised learning, active learning, self-learning, feature learning, reinforcement learning, and unsupervised learning. Machine learning (ML) models can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, etc.

Particularly, a ML model can be applied to a training batch of member preferences to estimate or generate a prediction of provider choice for a particular member. In some implementations, a derivative of a loss function is computed based on a comparison of an estimate with ground truth entities, and parameters of the ML model are updated based on the computed derivative of the loss function. The result of minimizing the loss function for multiple sets of training data trains, adapts, or optimizes the model parameters of the corresponding ML model. In this way, the ML model is trained to establish a relationship between member data and member selections.

After the machine learning models are trained, new data, including one or more sets of features for members, are received and/or derived from a document and/or data file. The first trained machine learning model may be applied to the new data to generate results (such as a prediction).

Figure 4:
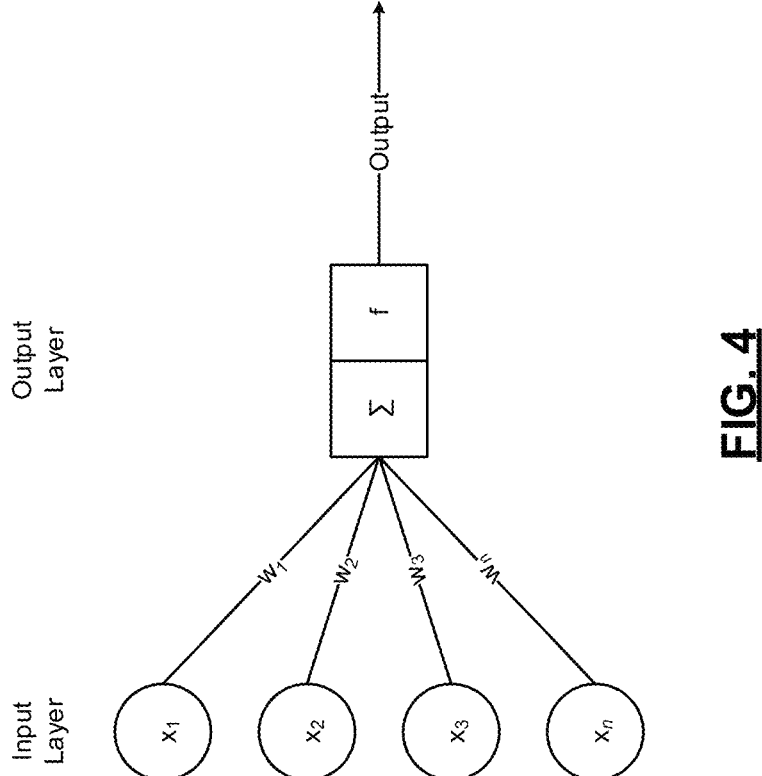
FIG. 4 is a functional block diagram of an example neural network.

FIG. 4 is a graphical representation of an example neural network with no hidden layers for implementing a machine learning module. In machine learning, a neural network—or an artificial neural network—is a network or circuit of artificial neurons or nodes having at least an input layer and an output layer. In various implementations, neural networks may also have one or more hidden layers. Neural networks may be used in deep learning applications to allow computer systems to solve artificial intelligence problems—such as problems in predictive modeling, pattern recognition, and dynamic control systems.

FIG. 4 shows a neural network without any hidden layers. The neural network of FIG. 4 may also be referred to as a single-layer perceptron. The neural network of FIG. 4 is shown with an input layer including n nodes, labeled $x_1$, $x_2$, $x_3$, and $x_n$. While only four nodes are illustrated in FIG. 4, the input layer may have any number of nodes. In various implementations, each node may represent any numerical value. For example, each node may represent a numerical value in a range of between 0 and 1. So, for example, the nodes of the input layer could be expressed in interval notation as: $x_1 \in [0,1]$, $x_2 \in [0,1]$, $x_3 \in [0,1]$, and $x_n \in [0,1]$. In various implementations, the input variables to a neural network may be expressed as a vector i having n dimensions. In the example of FIG. 4, input vector i may be represented by equation (1) below:

$$i = \left( x_1, x_2, x_3, x_n \right). \tag{1}$$

Each of the nodes may be multiplied by a weight—represented by $w_1$, $w_2$, $w_3$, and $w_n$ in FIG. 4—before being fed into a node in the next layer. In FIG. 4, because there are no hidden layers, the next layer is the output layer. For simplicity of illustration, only a single node is shown in the output layer of FIG. 4. However, the output layer may include any number of nodes.

At the node in the next layer, the inputs of the node are summed. Thus, because the inputs of the node in the output layer of FIG. 4 are the numerical value of each of the nodes of the previous layer multiplied by a weight, the summation $\Sigma$ may be represented by equation (2) below:

$$\sum = x_1 w_1 + x_2 w_2 + x_3 w_3 + x_n w_n. \tag{2}$$

In various implementations, a bias b may be added to the nodes x of the previous layer after they have been multiplied by a weight w. For example, if biases b are added, then summation $\Sigma$ may be represented by equation (3) below:

$$\sum = (x_1 w_1 + b_1) + (x_2 w_2 + b_2) + (x_3 w_3 + b_3) + (x_n w_n + b_n) \tag{3}$$

The summation $\Sigma$ may then be fed into an activation function f. The activation function f may be any mathematical function suitable for calculating an output for the node. Example activation functions f may include linear or non-linear functions, step functions such as the Heaviside step function, derivative or differential functions, monotonic functions, sigmoid or logistic activation functions, rectified linear unit (ReLU) functions, and/or leaky ReLU functions. The output of the function f is then the output of the node. In a neural network with no hidden layers—such as the single-layer perceptron shown in FIG. 4—the output of the nodes in the output layer are the output variables or output vector of the neural network.

Figure 5:
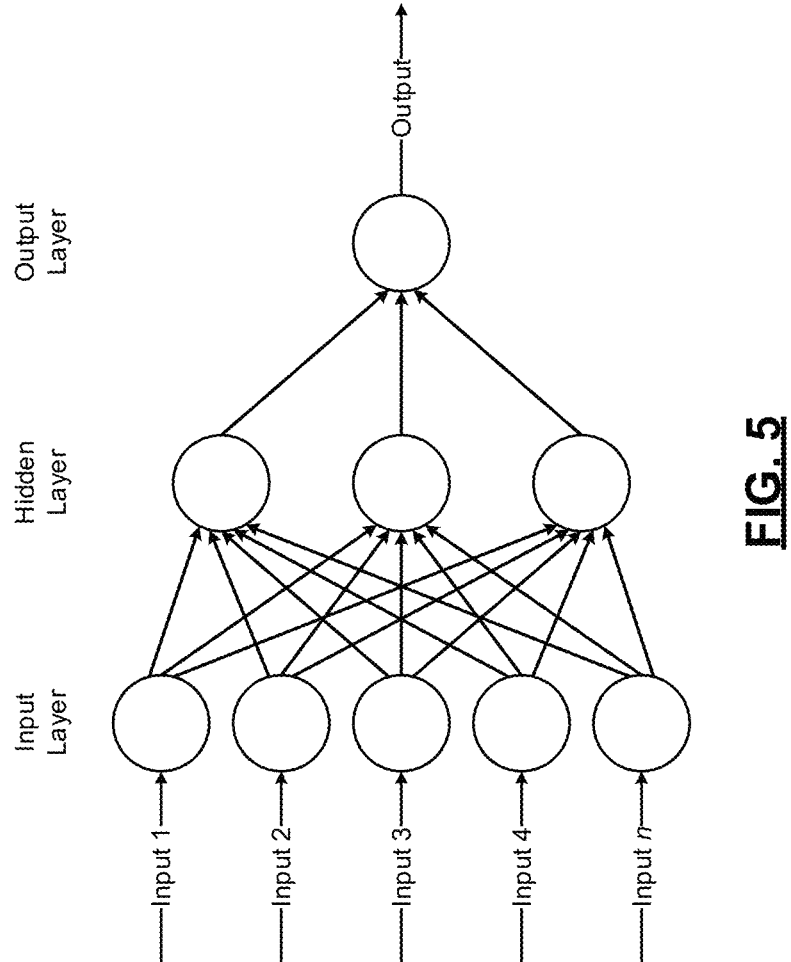
FIG. 5 is a functional block diagram of an example neural network.

FIG. 5 is a graphical representation of an example neural network with one hidden layer for implementing the machine learning module. As illustrated in FIG. 5, the neural network may one or more intermediate layers—referred to as hidden layers—between the input layer and the output layer. The neural network of FIG. 5 may be referred to as a multilayer perceptron. Each node of a hidden layer may be connected to one or more nodes of the previous layer and receive inputs from the connected nodes of the previous layer—such as the value of the node of the previous layer multiplied by a weight $(x_nw_n)$ or the value of the node of the previous layer multiplied by a weight with a bias added $(x_nw_n+b_n)$. Each node of the hidden layer may then function in a manner analogous to the node of the output layer of FIG. 4 by summing the inputs, feeding the summed inputs into an activation function, and feeding the output of the activation function into one or more nodes of the next layer. Similarly, the nodes of the output layer function in a manner analogous to the node of the output layer of FIG. 4. For example, the nodes of the output layer may receive the outputs of the nodes of the previous layer (multiplied by a weight and/or with a bias added as desired) as inputs, sum the received inputs, feed the summed inputs to an activation function, and output the result of the activation function as an output of the neural network.

In various implementations, the neural network may have any number of hidden layers. In various implementations, each node of a previous layer may be connected to any number of nodes of a next layer. For example, as shown in FIG. 5, each node of the previous layer may be connected to each node of the next layer. Such a neural network may be referred to as a fully-connected neural network. In various implementations, each layer of the neural network may have any number of nodes. In various implementations, a neural network with no hidden layers may function as a linear classifier and be suitable for representing linearly separable decisions or functions. In various implementations, neural networks with one hidden layer may be suitable for performing continuous mapping from one finite space to another. In various implementations, neural networks with two hidden layers may be suitable for approximating any smooth mapping to any level of accuracy.

Figure 6:
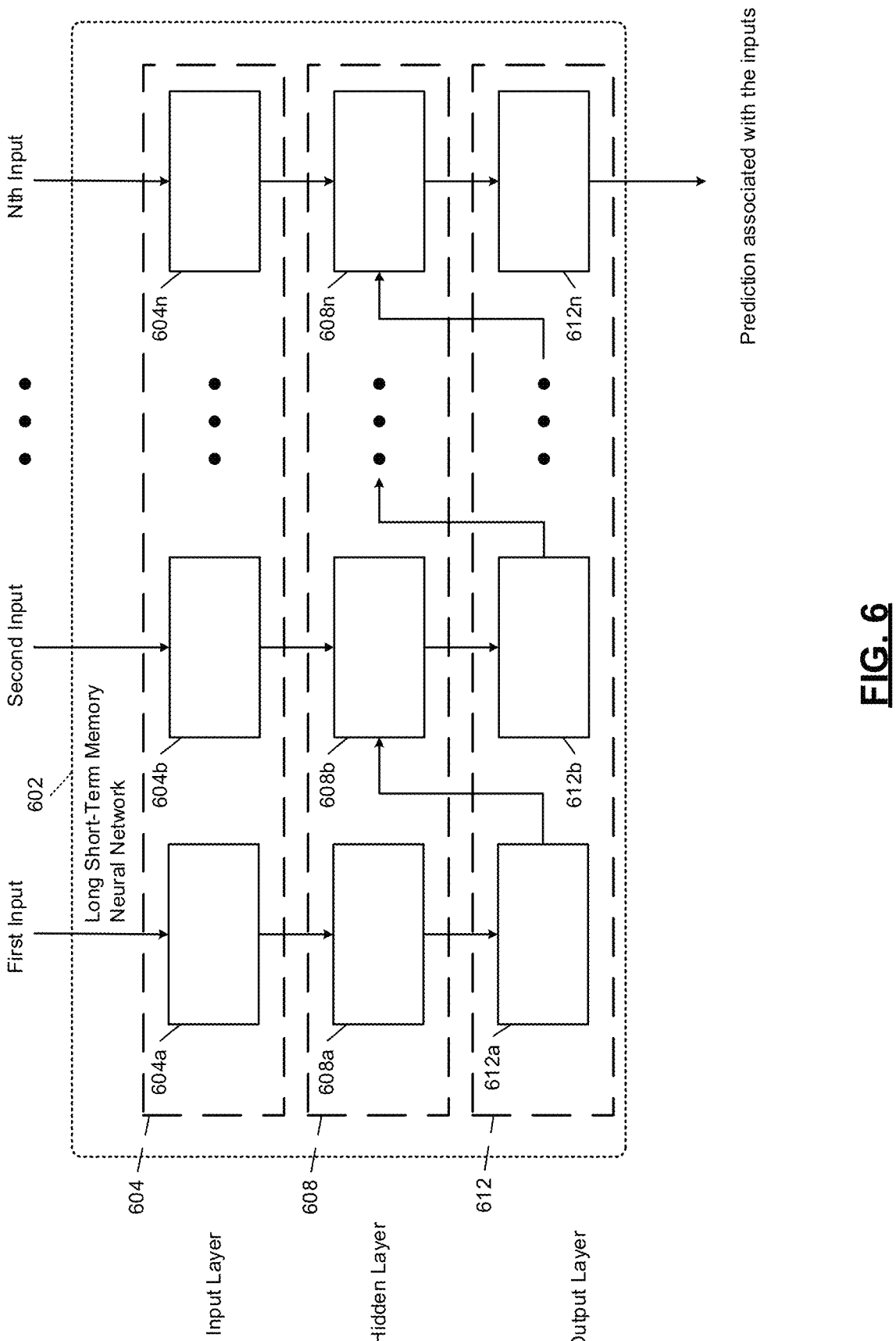
FIG. 6 is a functional block diagram of an example long short-term memory neural network.

FIG. 6 is a functional block diagram of an example neural network 602 that can be used to produce a predictive model. In some implementations, the neural network 602 can be a long short-term memory (LSTM) neural network. In some implementations, the neural network 602 can be a recurrent neural network (RNN). The example neural network 602 may be used to implement the machine learning as described herein, and various implementations may use other types of machine learning networks. The neural network 602 includes an input layer 604, a hidden layer 608, and an output layer 612. The input layer 604 includes inputs 604a, 604b . . . 604n. The hidden layer 608 includes neurons 608a, 608b . . . 608n. The output layer 612 includes outputs 612a, 612b . . . 612n.

Each neuron of the hidden layer 608 receives an input from the input layer 604 and outputs a value to the corresponding output in the output layer 612. For example, the neuron 608a receives an input from the input 604a and outputs a value to the output 612a. Each neuron, other than the neuron 608a, also receives an output of a previous neuron as an input. For example, the neuron 608b receives inputs from the input 604b and the output 612a. In this way the output of each neuron is fed forward to the next neuron in the hidden layer 608. The last output 612n in the output layer 612 outputs a probability associated with the inputs 604a-604n. Although the input layer 604, the hidden layer 608, and the output layer 612 are depicted as each including three elements, each layer may contain any number of elements. Neurons can include one or more adjustable parameters, weights, rules, criteria, or the like.

In various implementations, each layer of the neural network 602 must include the same number of elements as each of the other layers of the neural network 602. For example, training features may be processed to create the inputs 604a-604n.

The inputs 604a-604n can include data features (binary, vectors, factors or the like) and the features can be provided to neurons 608a-608n for analysis and connections between the known facts. The neurons 608a-608n, upon finding connections, provides the potential connections as outputs to the output layer 612.

In some examples, a convolutional neural network may be implemented. Similar to neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 604a is connected to each of neurons 608a, 608b . . . 608n.

The initial model that is built can be built in a secure environment using health data relating to patients. The initial model can then be refined based on feedback with a computing system that also is in a secure environment. The health data, e.g., the patient name, drug name, dosing data, and other prescription information, is always within a secure computing environment and not communicated out to a public data base and subjected to a third-party artificial intelligence. The secure computing system mitigates the risk of working with protected health data and other types of high-risk data, e.g., personal identifying information, and/or state protected data. In an example, the secure computing system is a mainframe computer with limited connection to external systems. In an example, the computing system is a private cloud environment that provides high-performance, secure, and flexible computing environments enabling the analysis of sensitive datasets restricted by federal privacy laws, proprietary access agreements, or confidentiality requirements. A private cloud environment can provide creation of any combination of network, CPU, RAM, and storage components into resource groups that can be used to build multi-tenant, multi-site infrastructure as a service.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. However, in various implementations, a subset of the first set may not be a proper subset: in certain circumstances, the subset may be coextensive with (equal to) the first set. In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code coupled with memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special purpose computer created by configuring a general purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method of determining a movement path for a vehicle from a source node to a goal node, the source node corresponding to a current position and a current orientation of the vehicle, the goal node corresponding to a goal position and a goal orientation of the vehicle, and the goal node being defined with respect to the source node, the method comprising:

determining a set of adjacent nodes, wherein each node of the set of adjacent nodes represents movement of the vehicle with respect to a current node;

determining a set of costs associated with the set of adjacent nodes;

determining a path-starting node based on a current node by:

determining, via a neural network, a predicted node based on the current node, wherein the predicted node represents movement of the vehicle with respect to the current node; and selecting the predicted node as the path-starting node;

determining, via the neural network, a first set of path nodes based on the path-starting node;

determining whether a path defined by the first set of path nodes connects the source node to the goal node;

in response to a determination that the path defined by the first set of path nodes does not connect the source node to the goal node:

determining an alternative path-starting node based on a lowest cost node of the set of adjacent nodes, and determining, via the neural network, a second set of path nodes based on the alternative path-starting node, and in response to a determination that the path defined by the first set of path nodes connects the source node to the goal node:

selecting the first set of path nodes as the movement path, and executing a set of actions associated with the movement path.

2. The method of claim 1 wherein the set of actions includes autonomously moving the vehicle along the movement path.

3. The method of claim 1 wherein the set of actions includes automatically controlling steering of the vehicle along the movement path.

4. The method of claim 1 wherein the set of actions includes automatically controlling steering, acceleration, and braking of the vehicle along the movement path.

5. The method of claim 1 wherein the set of actions includes displaying prompts to a driver for moving the vehicle along the movement path.

6. The method of claim 1 wherein the goal node corresponds to a vehicle parking position.

7. The method of claim 6 further comprising receiving location and orientation information for the goal node from a parking spot selection module.

8. The method of claim 1 further comprising, in response to a determination that the path defined by the second set of path nodes connects the source node to the goal node:

selecting the second set of path nodes as the movement path, and executing a second set of actions associated with the movement path.

9. The method of claim 1 wherein the neural network is generated via a machine learning model trained by reinforcement learning via repeated simulations of vehicle movement in varied environments.

10. The method of claim 1 wherein:

a respective cost of the set of costs is associated with a respective node; and the respective cost of the respective node is based on:

a quantity of movement direction changes associated with the respective node, a quantity of movement direction changes associated with a path formed from the source node to the respective node, a path length associated with the path formed from the source node to the respective node, a magnitude of a steering angle associated with the respective node, a magnitude of change in a steering angle from a previous node to the steering angle associated with the respective node, and whether the respective node was recommended by the neural network.

11. The method of claim 10 wherein the path length is measured in terms of at least one of:

a number of nodes, and a total movement distance.

12. The method of claim 1 wherein a respective node of the set of adjacent nodes is associated with a set of coordinates including:

an x-coordinate corresponding to a possible vehicle location;

a y-coordinate corresponding to the possible vehicle location; and an angle corresponding to a possible vehicle orientation at the possible vehicle location.

13. The method of claim 12 wherein the respective node of the set of adjacent nodes is associated with a first cost based on the possible vehicle location, a first movement distance, a first movement direction, and a first steering angle required to reach the possible vehicle location from the current node.

14. The method of claim 13 further comprising:

determining, based on a cost associated with the current node, whether the respective node of the set of adjacent nodes is associated with a cost above a cost threshold; and in response to the determination that the respective node is associated with a cost above the cost threshold, excluding the respective node from the set of adjacent nodes.

15. The method of claim 1 further comprising receiving, from an obstacle detection module, data corresponding to a set of obstacles.

16. A system of determining a movement path for a vehicle from a source node to a goal node, the source node corresponding to a current position and a current orientation of the vehicle, the goal node corresponding to a goal position and a goal orientation of the vehicle, and the goal node being defined with respect to the source node, the system comprising:

memory hardware; and processor hardware communicatively coupled to the memory hardware, wherein the processor hardware is configured to:

determine a set of adjacent nodes, wherein each node of the set of adjacent nodes represents movement of the vehicle with respect to a current node;

determine a set of costs associated with the set of adjacent nodes;

determine a path-starting node based on a current node by:

determining, via a neural network, a predicted node based on the current node, wherein the predicted node represents movement of the vehicle with respect to the current node; and selecting the predicted node as the path-starting node;

determine, via the neural network, a first set of path nodes based on the path-starting node;

determine whether a path defined by the first set of path nodes connects the source node to the goal node;

in response to a determination that the path defined by the first set of path nodes does not connect the source node to the goal node:

determine an alternative path-starting node based on a lowest cost node of the set of adjacent nodes, and determine, via the neural network, a second set of path nodes based on the alternative subsequent path-starting node, and in response to a determination that the path defined by the first set of path nodes connects the source node to the goal node:

select the first set of path nodes as the movement path, and execute a set of actions associated with the movement path.

17. The system of claim 16 wherein the processor hardware is configured to, in response to a determination that the path defined by the second set of path nodes connects the source node to the goal node:

select the second set of path nodes at the movement path, and execute a second set of actions associated with the movement path.

18. The system of claim 16 wherein:

a respective cost of the set of costs is associated with a respective node;

the respective cost of the respective node is based on:

a quantity of movement direction changes associated with the respective node, a quantity of movement direction changes associated with a path formed from the source node to the respective node, a path length associated with the path formed from the source node to the respective node, a magnitude of a steering angle associated with the respective node, a magnitude of change in a steering angle from a previous node to the steering angle associated with the respective node, and whether the respective node was recommended by the neural network; and the path length is measured in terms of at least one of:

a number of nodes, and a total movement distance.

19. The system of claim 16 wherein a respective node of the set of adjacent nodes is associated with a set of coordinates including:

an x-coordinate corresponding to a possible vehicle location;

a y-coordinate corresponding to the possible vehicle location; and an angle corresponding to a possible vehicle orientation at the possible vehicle location.

20. The system of claim 19 wherein:

the respective node of the set of adjacent nodes is associated with a first cost based on the possible vehicle location, a first movement distance, a first movement direction, and a first steering angle required to reach the possible vehicle location from the current node, and
the processor hardware is configured to:
  determine, based on a cost associated with the current node, whether the respective node of the set of adjacent nodes is associated with a cost above a cost threshold; and
  in response to the determination that the respective node is associated with a cost above the cost threshold, exclude the respective node from the set of adjacent nodes.

21. The method of claim 1, wherein:
determining, via the neural network, the predicted node based on the current node includes the neural network receiving a set of obstacle data as input, and
determining via the neural network, a first set of path nodes based on the path-starting node includes the neural network receiving a set of obstacle data as input.

22. The method of claim 1, wherein the goal node is not adjacent to the source node.

23. The system of claim 16, wherein:
determining, via the neural network, the predicted node based on the current node includes the neural network receiving a set of obstacle data as input, and
determining via the neural network, a first set of path nodes based on the path-starting node includes the neural network receiving a set of obstacle data as input.

24. The system of claim 16, wherein the goal node is not adjacent to the source node.

\* \* \* \* \*